US012108757B2

(12) United States Patent
Faers et al.

(10) Patent No.: US 12,108,757 B2
(45) Date of Patent: Oct. 8, 2024

(54) AGROCHEMICAL FORMULATION BASED ON EMULSION POLYMERS

(71) Applicant: Bayer CropScience Aktiengesellschaft, Monheim am Rhein (DE)

(72) Inventors: Malcolm Faers, Duesseldorf (DE); Howard Roger Dungworth, East Yorkshire (GB); James Richard Wickson, East Yorkshire (GB); Kathryn Marie Knight, East Yorkshire (GB); James Alexander Flavell, East Yorkshire (GB)

(73) Assignee: Bayer CropScience Aktiengesellschaft, Monheim am Rhein (DE)

( * ) Notice: Subject to any disclaimer, the term of this patent is extended or adjusted under 35 U.S.C. 154(b) by 506 days.

(21) Appl. No.: 16/303,498

(22) PCT Filed: May 18, 2017

(86) PCT No.: PCT/EP2017/061973
§ 371 (c)(1),
(2) Date: Nov. 20, 2018

(87) PCT Pub. No.: WO2017/202684
PCT Pub. Date: Nov. 30, 2017

(65) Prior Publication Data
US 2020/0315165 A1    Oct. 8, 2020

(30) Foreign Application Priority Data
May 25, 2016 (EP) .................................. 16171325

(51) Int. Cl.
*A01N 25/04* (2006.01)
*A01N 33/22* (2006.01)
*A01N 37/22* (2006.01)
*A01N 37/48* (2006.01)
*A01N 43/08* (2006.01)
*A01N 43/12* (2006.01)
*A01N 43/30* (2006.01)
*A01N 43/40* (2006.01)
*A01N 43/56* (2006.01)
*A01N 43/647* (2006.01)
*A01N 43/713* (2006.01)
*A01N 43/80* (2006.01)
*A01N 43/82* (2006.01)

(52) U.S. Cl.
CPC ............. *A01N 25/04* (2013.01); *A01N 33/22* (2013.01); *A01N 37/22* (2013.01); *A01N 37/48* (2013.01); *A01N 43/08* (2013.01); *A01N 43/12* (2013.01); *A01N 43/30* (2013.01); *A01N 43/40* (2013.01); *A01N 43/56* (2013.01); *A01N 43/647* (2013.01); *A01N 43/713* (2013.01); *A01N 43/80* (2013.01); *A01N 43/82* (2013.01)

(58) Field of Classification Search
CPC ........ A01N 43/30; A01N 43/40; A01N 25/04; A01N 33/22; A01N 37/22; A01N 37/48; A01N 43/08; A01N 43/12; A01N 43/56; A01N 43/647; A01N 43/713; A01N 43/80; A01N 43/82
USPC ......................................................... 514/314
See application file for complete search history.

(56) References Cited

U.S. PATENT DOCUMENTS

| | | | |
|---|---|---|---|
| 5,834,006 A | 11/1998 | Smith et al. | |
| 6,436,421 B1* | 8/2002 | Schindler | A01N 25/10 424/405 |
| 7,897,543 B2 | 3/2011 | Bretschneider et al. | |
| 8,946,234 B2 | 2/2015 | Maue et al. | |
| 9,000,189 B2 | 4/2015 | Bretschneider et al. | |
| 9,044,011 B2 | 6/2015 | Reid et al. | |
| 9,642,363 B2 | 5/2017 | Koehler et al. | |
| 10,051,861 B2 | 8/2018 | Koehler et al. | |
| 2008/0213326 A1* | 9/2008 | Amrhein | C08L 97/02 424/405 |
| 2008/0305955 A1 | 12/2008 | Bretschneider et al. | |
| 2009/0093364 A1* | 4/2009 | Endo | A01N 25/10 514/357 |
| 2011/0190493 A1 | 8/2011 | Bretschneider et al. | |
| 2011/0301181 A1 | 12/2011 | Maue et al. | |
| 2011/0306499 A1 | 12/2011 | Bretschneider et al. | |
| 2013/0338223 A1 | 12/2013 | Reid et al. | |
| 2014/0315898 A1 | 10/2014 | Koehler et al. | |
| 2015/0099766 A1 | 4/2015 | Maue et al. | |
| 2017/0057914 A1 | 3/2017 | Koehler et al. | |

FOREIGN PATENT DOCUMENTS

| | | |
|---|---|---|
| CN | 100469245 C | 3/2009 |
| CN | 102834423 A | 12/2012 |
| DE | 4341156 C1 | 2/1995 |
| EP | 0862856 A1 | 9/1998 |
| EP | 2 587 916 A1 | 5/2013 |

(Continued)

OTHER PUBLICATIONS

PCT International Search Report for PCT/EP2017/061973, dated Jul. 12, 2017.

*Primary Examiner* — Michael B. Pallay
(74) *Attorney, Agent, or Firm* — McBee Moore & Vanik, IP, LLC

(57) ABSTRACT

The present invention relates to agrochemical compositions based on emulsion polymers; their use for foliar application and their application in aqueous crop protection flowable formulations for controlling agricultural pests, weeds or diseases and reducing the wash-off of active ingredients by rainfall.

10 Claims, No Drawings

(56) References Cited

FOREIGN PATENT DOCUMENTS

| | | |
|---|---|---|
| EP | 2611885 A2 | 7/2013 |
| GB | 658222 | 10/1951 |
| GB | 658222 A | 10/1951 |
| JP | 2019522636 A | 8/2019 |
| WO | 89/03175 A1 | 4/1989 |
| WO | 1995/007613 A1 | 3/1995 |
| WO | 00060942 A1 | 10/2000 |
| WO | 01/93679 A1 | 12/2001 |
| WO | 2005/115413 A1 | 12/2005 |
| WO | 2006/089633 A2 | 8/2006 |
| WO | 2008/002623 A1 | 1/2008 |
| WO | 2008/067911 A1 | 6/2008 |
| WO | 2009/138523 A2 | 11/2009 |
| WO | 2010/051926 A2 | 5/2010 |
| WO | 2011112768 A1 | 9/2011 |
| WO | 2012/003060 A1 | 1/2012 |
| WO | 2012/121413 A1 | 9/2012 |
| WO | 2013/092350 A1 | 6/2013 |
| WO | 2015/165916 A1 | 11/2015 |
| WO | 16055439 A1 | 4/2016 |
| WO | 2017203261 A1 | 11/2017 |

\* cited by examiner

AGROCHEMICAL FORMULATION BASED ON EMULSION POLYMERS

CROSS-REFERENCE TO RELATED APPLICATIONS

This application is a National Stage entry of International Application No. PCT/EP2017/061973, filed May 18, 2017, which claims priority to European Patent Application No. 16171325.0, filed May 25, 2016.

BACKGROUND

Field

The present invention relates to agrochemical compositions based on emulsion polymers; their use for foliar application and their application in aqueous crop protection flowable formulations for controlling agricultural pests, weeds or diseases and reducing the wash-off of active ingredients by rainfall.

Description of Related Art

Biological efficacy of pesticides is influenced by many factors, particularly the residence time of the pesticide on the treated surface, which is often a plant leaf surface. A major factor influencing the residence time is the degree to which the pesticide resists wash-off by rain, that is, rainfastness. With aqueous dispersion formulations, rainfastness may be improved by including ingredients in the formulation or adding such ingredients to the spraytank (tank mixing) that, during drying, provide a water-resistant bond between the pesticide and the substrate. For example, emulsified oil or water insoluble polymers prepared as emulsions have been used to improve liquid formulation rainfastness.

A pesticide is considered rainfast, if it has been adsorbed/absorbed by the plant surface so that it will still remain available after rainfall or irrigation. In the scope of this invention rainfastness is thus defined as the percentage of active ingredient that remains on the crop after rainfall or irrigation. The degree of rainfastness of pesticides is highly variable and depends on the physico-chemical properties of the active ingredient.

There are different solutions already known and described in the prior art. For example GB-P 658,222 discloses the use of vinyl chloride and/or vinylidene chloride polymers and copolymers in aqueous pesticidal compositions for reducing the wash-off of pesticide residues by rainfall.

WO-A 2012/121413 discloses aqueous pesticidal compositions comprising a pesticidal active ingredient, a carboxy-modified methyl methacrylate-butadiene copolymer, a surfactant and water, having excellent pesticidal activity and being rainfall resistant.

WO-A 2005/115413 discloses a rain-fast bioactive composition comprising a bioactive ingredient and a suspension concentrate of a latex polymer emulsified with an in-situ crosslinked hydrocarbon polymer.

WO-A 2008/002623 discloses pesticide formulations with substituted biopolymers and organic polymers for improving residual activity, droplet size, adherence and rainfastness on leaves and reduction in soil leaching. This however is not of the nature of the invention disclosed here.

EP-A 0 862 856 discloses pesticide compositions comprising a pesticide and a redispersible polymer. However, the document discloses solid formulations.

EP-A 2 587 916 discloses compositions for the control of pests, the processes for their preparation and methods of treating (non-plant) surfaces with such formulations for the sustained weather-resistant control of pests. The composition includes a pesticide and an aqueous polymer dispersion comprising a styrene n-butylacrylate t-butylacrylate terpolymer.

There are also different applications of polymer dispersions described in the prior art for improvement of the stability of formulations:

WO-A 89/03175 discloses the use of a latex dispersion for the preparation of aqueous dispersions within which the active ingredient is contained and furthermore that these showed improved long term stability. This is however not of the nature of the invention disclosed here.

U.S. Pat. No. 5,834,006 describes the use of a latex dispersion for improving the incompatibility of two or more active ingredients by the inclusion of one of the active ingredients within the latex phase. Furthermore there is no mention regarding rainfastness.

WO-A 2009/138523 discloses formulated compositions suitable for controlling or preventing pathogenic damage in a plant based on a solid active ingredient, at least one non-ionic surface active compound, one or more customary formulation auxiliaries and water. An example of an ethylene vinyl acetate terpolymer dispersion is given where its use in tank mix with an SC formulation of the insecticide abermectin illustrated improved biological efficacy. However, there were no examples relating to the inclusion of polymer dispersions into formulations or the stability of such compositions.

WO-A 2015/165916 describes the use of styrene-maleimide co-polymer particles in aqueous based dispersion formulations and the benefits for reducing wash-off by rainfall. However, there are no examples regarding formulation recipes or formulation stability.

The relevant compositions described often only describe the use of a polymeric dispersion/latex in tank mixture with little information regarding how it may be successfully included in formulation recipes and the resulting stability of such formulations.

A major disadvantage of the polymer dispersions/latexes described in the prior art is that they frequently have only a limited storage stability when incorporated in aqueous dispersion formulations with the result that the formulation can no longer be applied by the customer.

It is therefore most desirable for practical purposes to provide highly storage-stable aqueous pesticide concentrates having no organic solvents or only solvent amounts to dissolve a crystalline pesticide in the form of an emulsion and which can be diluted easily with pure water, thereby forming stable dilute emulsions for application purposes. An aqueous suspension concentrate, suspo-emulsion, aqueous suspension, capsule suspension and concentrated emulsion which is stable under storage for at least two years is desired.

Moreover the compositions should have an excellent rainfastness Rainfall can adversely affect a pesticide application by physically washing the active ingredient from the crop to which it is applied or diluting the product to a less effective form. Redistribution of the active ingredient can also happen after rainfall so that the active ingredient may remain less available. Rainfastness according to the present invention is the ability of an active ingredient to remain available on the crop for a longer time when exposed to wet, windy or rainy conditions. Rainfastness leads to a long lasting activity of the active ingredient(s) under adverse weather conditions such as rain or wind. Rainfastness can allow a lower dose of active ingredient to be applied with minimal loss of performance and/or allow for longer intervals between spray applications. Application of a low dose of active ingredient and/or with longer spray intervals can also lead to improved crop safety and reduced phytotoxicity. Furthermore, reduced wash-off of active ingredients from crops by rain is also important in reducing unwanted off-target losses of active ingredients to the environment, which is a further benefit of the invention.

Accordingly there is still a need to develop compositions exhibiting rainfastness and low wash-off which at the same time show a better storage-stability.

The object of the present invention was therefore to provide highly storage-stable aqueous suspension concentrates, suspo-emulsions, aqueous suspensions, capsule suspensions and concentrated emulsions which show excellent rainfastness and biological efficacy for use in foliar applications.

SUMMARY

This objective was solved by the present invention by providing enhanced resistance of the active ingredient(s) to wash-off from plant surfaces by rain with improved stability in aqueous based suspension concentrate, suspo-emulsion, aqueous suspension, capsule suspension or concentrated emulsion crop protection formulations.

The present invention is directed to agrochemical compositions comprising a) an aqueous dispersion of at least one agrochemical active compound, which is solid at room temperature,
b) an emulsion polymer system comprising I) stabiliser polymer; and II) core-stabiliser copolymer, wherein the I) stabiliser polymer comprises acid based and hydrophobe monomers having a weight/number ratio of said acid to hydrophobe of 10-90:90-10, a Tg in the range from 30° C. to 300° C., and a molecular weight less than 100,000; and the II) core polymer having a Tg in the range from −100° C. to 10° C. and
c) one or more additives selected from the group consisting of non-ionic or anionic surfactants or dispersing aids,
d) rheological modifiers,
e) and other formulants.

In an embodiment, agrochemical compositions according to the invention may additionally comprise:

f) penetration promoters, wetting agents, spreading agents and/or retention agents.

The present invention is also directed to the use of the compositions according to the invention for foliar application.

DETAILED DESCRIPTION OF A PREFERRED EMBODIMENT

In the context of the present invention aqueous based agrochemical compositions are by definition suspension concentrates, suspo-emulsions, aqueous suspensions, capsule suspensions or emulsion concentrates.

A further aspect of the present invention is the use of agrochemical compositions according to the invention to combat or control an agricultural pest, weed or disease.

The present invention is directed to the use of the agrochemical compositions according to the invention to improve the rainfastness of an agrochemical active ingredient as well as the resistance to wash-off by rain of an agrochemical active ingredient.

The present invention is also directed to the use of the compositions according to the invention to reduce off-target losses to the environment of an agrochemical active ingredient.

The glass transition temperature (Tg) is known for many polymers and can if necessary be determined according to, for instance, ASTM E1356-08 (2014) "Standard Test Method for Assignment of the Glass Transition Temperatures by Differential Scanning calorimetry". For instance by DSC with drying at 110° C. for one hour to eliminate effect of water and/or solvent, DSC sample size of 10-15 mg, from −100° C. to 100° C. at 20° C./min under N2, with Tg defined as midpoint of the transition region Minimum film forming temperature (MFFT) can be measured for instance according to ASTM D2354-10e1.

Suitable compounds a) of the compositions according to the invention are agrochemical active compounds which are solid at room temperature.

Solid, agrochemical active compounds a) are to be understood in the present composition as meaning all substances customary for plant treatment, whose melting point is above 20° C. Fungicides, bactericides, insecticides, acaricides, nematicides, molluscicides, herbicides, plant growth regulators, plant nutrients, biological actives substances and repellents may preferably be mentioned.

Preferred insecticides a) are imidacloprid, nitenpyram, acetamiprid, thiacloprid, thiamethoxam, clothianidin;
cyantraniliprole, chlorantraniliprole, flubendiamide, tetraniliprole, cyclaniliprole;
spirodiclofen, spiromesifen, spirotetramat;
abamectin, acrinathrin, chlorfenapyr, emamectin, ethiprole, fipronil, flonicamid, flupyradifurone, indoxacarb, metaflumizone, methoxyfenozid, milbemycin, pyridaben, pyridalyl, silafluofen, spinosad, sulfoxaflor, triflumuron;
compound mentioned in WO 2006/089633 as example I-1-a-4, compound mentioned in WO 2008/067911 as example I-1-a-4, compound mentioned in WO 2013/092350 as example Ib-14, compound mentioned in WO 2010/51926 as example Ik-84.

More preferred insecticides a) are imidacloprid, acetamiprid, thiacloprid, thiamethoxam, cyantraniliprole, chlorantraniliprole, flubendiamide, tetraniliprole, cyclaniliprole, spiromesifen, spirotetramat, ethiprole, fipronil, flupyradifurone, methoxyfenozid, sulfoxaflor and triflumuron.

Preferred fungicides a) are for example such as bixafen, fenamidone, fenhexamid, fluopicolide, fluopyram, fluoxastrobin, iprovalicarb, isotianil, pencycuron, penflufen, propineb, prothioconazole, tebuconazole, trifloxystrobin, ametoctradin, amisulbrom, azoxystrobin, benthiavalicarb-isopropyl, benzovindiflupyr, boscalid, carbendazim, chlorothanonil, cyazofamid, cyflufenamid, cymoxanil, cyproconazole, difenoconazole, ethaboxam, epoxiconazole, famoxadone, fluazinam, fluquinconazole, flusilazole, flutianil, fluxapyroxad, isopyrazam, kresoxim-methyl, lyserphenvalpyr, mancozeb, mandipropamid, oxathiapiprolin, penthiopyrad, picoxystrobin, probenazole, proquinazid, pydiflumetofen, pyraclostrobin, sedaxane, tebufloquin, tetraconazole, valiphenalate, zoxamide, N-cyclopropyl-3-(difluoromethyl)-5-fluoro-N-(2-isopropylbenzyl)-1-methyl-1H-pyrazole-4-carboxamide, 2-{3-[2-(1-{[3,5-bis(difluoromethyl)-1H-pyrazol-1-yl]acetyl}-piperidin-4-yl)-1,3-thiazol-4-yl]-4,5-dihydro-1,2-oxazol-5-yl}-3-chlorophenyl methanesulfonate.

More preferred fungicides a) are for example such as bixafen, fenamidone, fluopicolide, fluopyram, fluoxastrobin, isotianil, penflufen, propineb, prothioconazole, tebuconazole, trifloxystrobin, ametoctradin, amisulbrom, azoxystrobin, benthiavalicarb-isopropyl, benzovindiflupyr, boscalid, chlorothanonil, cyazofamid, cyflufenamid, cymoxanil, cyproconazole, difenoconazole, ethaboxam, epoxiconazole, fluazinam, fluquinconazole, fluxapyroxad, isopyrazam, lyserphenvalpyr, mancozeb, oxathiapiprolin, penthiopyrad, picoxystrobin, probenazole, proquinazid, pydiflumetofen, pyraclostrobin, tetraconazole, valiphenalate, zoxamide, N-cyclopropyl-3-(difluoromethyl)-5-fluoro-N-(2-isopropylbenzyl)-1-methyl-1H-pyrazole-4-carboxamide, 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate.

Preferred herbicides a) are for example (always comprise all applicable forms such as acids, salts, ester, with at least one applicable form): aclonifen, amidosulfuron, bensulfuron-methyl, bromoxynil, bromoxynil potassium, chlorsulfuron, clodinafop, clodinafop-propargyl, clopyralid, 2,4-D, 2,4-D-dimethylammonium, -diolamin, -isopropylammonium, -potassium, -triisopropanolammonium, and -trolamine, 2,4-DB, 2,4-DB dimethylammonium, -potassium, and -sodium, desmedipham, dicamba, diflufenican, diuron, ethofumesate, ethoxysulfuron, fenoxaprop-P, fenquinotrione, flazasulfuron, florasulam, flufenacet, fluroxypyr, flurtamone, fomesafen, fomesafen-sodium, foramsulfuron, glufosinate, glufosinate-ammonium, glyphosate, glyphosate-isopropylammonium, -potassium, and trimesium, halauxifen, halauxifen-methyl, halosulfuron-methyl, indaziflam, iodosulfuron-methyl-sodium, isoproturon, isoxaflutole, lenacil, MCPA, MCPA-isopropylammonium, -potassium, and sodium, MCPB, MCPB-sodium, mesosulfuron-methyl, mesotrione, metosulam, metribuzin, metsulfuron-methyl, nicosulfuron, pendimethalin, penoxsulam, phenmedipham, pinoxaden, propoxycarbazone-sodium, pyrasulfotole, pyroxasulfone, pyroxsulam, rimsulfuron, saflufenacil, sulcotrion, tefuryltrione, tembotrione, thiencarbazone-methyl, topramezone, triafamone, tribenuron-methyl.

More preferred herbicides a) are for example (always comprise all applicable forms such as acids, salts, ester, with at least one applicable form): amidosulfuron, bensulfuron-methyl, chlorsulfuron, diflufenican, ethoxysulfuron, fenquinotrione, flaza-sulfuron, flufenacet, fluroxypyr, foramsulfuron, halauxifen, halauxifen-methyl, halosulfuron-methyl, iodosulfuron-methyl-sodium, mesosulfuron-methyl, mesotrione, metsulfuron-methyl, nicosulfuron, penoxsulam, pinoxaden, propoxycarbazone-sodium, pyrasulfotole, pyroxasulfone, rimsulfuron, tembotrione, thien-carbazone-methyl, tribenuron-methyl.

According to the invention safeners are also included as agrochemical compounds. Preferred safeners a) are: Mefenpyr-diethyl, Cyprosulfamide, Isoxadifen-ethyl, (RS)-1-methylhexyl (5-chloroquinolin-8-yloxy)acetate (Cloquintocet-mexyl, CAS-No.: 99607-70-2).

Suitable active ingredients according to the invention may optionally additionally include soluble active ingredients for example dissolved in the aqueous carrier phase and/or liquid active ingredient(s) for example dispersed as an emulsion in the aqueous carrier phase.

The stabiliser polymer (I) may be formed from copolymers of acid based monomers and hydrophobic monomers and may be a water soluble polymer, said solubility arising as a result of neutralisation of the polymer or monomers comprised therein.

The stabiliser polymer (I) may have a Tg in the range from 30° C. to 300° C., preferably 50° C. to 160° C., more preferably 70° C. to 150° C., and most preferably 80° C. to 120° C.

Tg values in the specified ranges are desired to ensure that the resulting emulsion polymer doesn't create an overly sticky coating by which the coated seeds would simply stick together. The Tg value of the stabiliser polymer (I) may be controlled by the correct choice of co-monomers.

The stabiliser polymer (I) is that it has to be of relatively low molecular weight for it to behave as a stabiliser. This means polymers having a molecular weight of less than 100,000. Higher molecular weight polymers would create high viscosities of the aqueous emulsion final product which will be detrimental to both manufacture and use. This aspect may be controlled by the polymerisation process.

The stabiliser polymer (I) may have a molecular weight less than 50,000. Preferably, less than 35,000. More preferably, less than 25,000. The molecular weight may be in the range from 2,000 to 25,000. More preferably, in the range from 4,000 to 18,000. Further preferably, in the range from 6,000 to 12,000. Most preferably, in the range from 7,500 to 10,000.

Preferable stabiliser polymers (I) are copolymers of acrylic acid with alkyl methacrylates or styrene with molecular weights of less than 20,000, and a Tg of more than 30° C.

The acid based monomers of the stabiliser polymer (I) may be selected from the broad groups of monomers which contain an acid such as carboxylic acid monomers, sulphonic acid monomers and phosphonic acid derivatives. The selection of monomer enables the stabiliser to be water soluble when in neutralised form and when copolymerised with hydrophobic monomers.

The stabiliser polymer (I) may have a weight ratio of carboxylic acid to hydrophobe of 10-90:90-10, preferably 12-50:50-88, more preferably 15-40:85-60, and most preferably 20-30:80-70.

The acid based monomers of the stabiliser polymer may be selected from monomers of acrylic acid, methacrylic acid, itaconic acid, maleic acid, crotonic acid, sulphate acid derivatives of (meth)acrylic acid, sulphonic acid monomers such as AMPS, styrene sulphonic acid, vinyl sulphonic acid, allyl sulphonic acid, phosphonic acid derivatives such as vinyl phosphonic acid, or a mixture thereof. Preferably, acrylic acid, or methacrylic acid. More preferably, the monomer is methacrylic acid.

In an alternative embodiment the stabiliser polymer (I) may be a homopolymer of polyvinyl alcohol (PVA), and said homopolymer may be hydrolysed at more than 70%.

The hydrophobe monomer (I.2) may be vinyl monomer or vinyl aromatic monomer. Alternatively, the vinyl aromatic monomer may be replaced by other suitable monomers such as methyl methacrylate or other suitable alternatives.

Suitable vinyl aromatic monomers may preferably comprise from 8 to 20 carbon atoms, most preferably from 8 to 14 carbon atoms. Examples of vinyl aromatic monomers are styrene including substituted styrene, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, 4-(phenylbutyl) styrene, alpha-methylstyrene, and halogenated styrenes.

The vinyl aromatic monomer(s) can be, and desirably is, styrene as such or a substituted styrene particularly a hydrocarbyl, desirably alkyl, substituted styrene, in which the substituent(s) are on the vinyl group or on the aromatic ring of the styrene e.g. α-methyl styrene and vinyl toluene.

The styrene monomer can be or include styrene monomers including strongly acid, particularly sulphonic acid substituents. When present such strong acid modified monomers usually form from 1 to 30 mol. %, more usually 2 to 20 mol. %, and desirably from 5 to 15 mol. %, of the styrene monomers in the copolymer.

Preferably the vinyl aromatic monomer is styrene, α-methyl styrene, or a combination thereof.

Where the vinyl aromatic monomer is a mixture of styrene and a substituted styrene the monomer mixture may comprise in the range from 80-95 wt. % styrene and 5-20 wt. % substituted styrene.

Preferably the stabiliser polymer (I) may be a styrene (meth)acrylic acid copolymer. The repeating units in the copolymer are conveniently considered as residues of monomer components.

If the water dispersible styrene (meth)acrylic copolymer used in the invention, the molar ratio of residues of the (meth)acrylic acid monomer(s) to those of the styrene monomer(s) is generally from 20:1 to 1:5, more usually 10:1 to 1:2 and particularly from 3:1 to 1:1.

Generally correspondingly, the proportions of residues of the monomers by weight are typically from 93 wt. % to 10 wt. %, more usually 87 wt. % to 25 wt. %, particularly 67 wt. % to 40 wt. %, of the (meth)acrylic acid monomer(s) and from 7 wt. % to 90 wt. %, more usually 13 wt. % to 75 wt. %, particularly 33 wt. % to 60 wt. %, of the styrene monomer(s).

The (meth)acrylic acid monomer(s) can comprise further monomers which are derivatives of (meth)acrylic acid. The derivatives of (meth)acrylic acid may include strong acid, and especially strong acids comprising sulphate acid or sulphonic acid groups (or their salts). Examples of such monomers include acrylamido methyl propyl sulphonate (AMPS) and (meth)acrylic acid isethionate.

When present such strong acid modified monomers usually form from 1 to 30 mol. %, more usually 2 to 20 mol. %, and desirably from 5 to 15 mol. %, of the acrylic acid monomers in the copolymer.

Other monomers, such as acidic monomers e.g. itaconic acid or maleic acid or anhydride; strongly acidic monomers such as methallyl sulphonic acid (or a salt); or non-acidic acrylic monomers e.g. acrylic esters which may be alkyl esters particularly C1 to C6 alkyl esters such as methyl methacrylate, butyl methacrylate or butyl acrylate or hydroxy alkyl esters particularly C1 to C6 hydroxyalkyl esters such as hydroxy ethyl methacrylate, or hydroxy propyl methacrylate; or vinyl monomers such as vinyl acetate, can be included. The proportion by weight of other monomers will typically be not more than about 30 wt. %, usually not more than about 20 wt. %, more usually not more than about 10 wt. %.

The polymer can be a single styrene acrylic acid copolymer or a blend including two or more such copolymers. In particular, when strong acid residues are included in the polymeric dispersant, the dispersant can be a blend of copolymer including strong acid residues and copolymer not including such residues. In such blends, it is generally desirable that the ratio of such copolymers is from 1:10 to 10:1, more usually 5:1 to 1:5, by weight. In particular, the proportion of copolymer including strong acid residues is desirably at least 25%, more usually at least 40%, by weight of the polymer.

The inclusion of monomers having strongly acidic substituent groups in the polymeric dispersant can provide improved dispersion of solid components in formulation such as solid granular agrochemical actives.

The polymer can be used as the free acid or as a salt. In practice, the form present in a formulation will be determined by the acidity of the formulation. Desirably, the formulation will be near neutral and so most of the acid groups will be present as salts. The cations in any such salt can be alkali metal, particularly sodium and/or potassium, ammonium, or amine, including alkanolamine such as ethanolamine, particularly tri-ethanolamine. In particular, sodium or potassium salts forms of the stabiliser polymer are preferred.

The neutralisation with at least 80% sodium is preferred, preferably 90%, most preferably greater than 95%.

The polymer used in the formulation of the invention may be wholly of styrene (meth)acrylic copolymers or it may include other dispersant materials such as the conventional dispersants mentioned above, such as naphthalene sulphonate formaldehyde condensates, lignosulphonates, maleic anhydride copolymers and condensed phenolsulphonic acid and their salts. When used in such combinations the weight ratio of styrene (meth)acrylic copolymer(s) to such conventional dispersants will usually be 16 to 2:1 respectively, and more usually 12 to 4:1, particularly from 10 to 6:1.

The stabiliser polymer (I) is preferably anionic.

The amount of acrylic acid monomer present in the stabiliser polymer (I) may be in the range from 10 wt. % to 70 wt. %. Preferably, 20 wt. % to 60 wt. %. More preferably from, 25 wt. % to 50 wt. %. Most preferably, from 30 wt. % to 40 wt. %.

The amount of vinyl aromatic monomer present in the stabiliser polymer (I) may be in the range from 90 wt. % to 30 wt. %. Preferably, 80 wt. % to 40 wt. %. More preferably from, 75 wt. % to 50 wt. %. Most preferably, from 70 wt. % to 60 wt. %.

The pH of the stabiliser polymer (I) may be in the range from 5 to 10. More preferably, in the range from 6 to 9. Further preferably, in the range from 7 to 9. Most preferably, in the range from 7.5 to 8.5.

The stabiliser polymer (I) can be made by free radical initiated polymerisation, e.g. using a peroxide or a redox initiator, particularly by solution polymerisation, of the constituent monomers, optionally also with a chain transfer agent such as an alkyl mercaptan which acts to control the molecular weight of the polymer. Suitable methods are described for example in EP 0697422.

The stabiliser polymer (I) may also be made by a solvent swap method in a hydrophilic solvent mixture, for example IPA/water mix, with addition of monomer feeds with initiator, monomer reacts and then distilled and neutralised simultaneously.

The core polymer (II) is preferably a soft hydrophobic polymer which is water insoluble. Preferably the core polymer (II) does not comprise water soluble monomers, and/or acid based monomers. The core polymer (II) is preferably a neutral polymer.

The core polymer (II) may have a Tg in the range from −100° C. to 0° C., preferably −70° C. to 0° C., more preferably −55° C. to −10° C., and most preferably −40 to −10° C.

The core polymer (II) may comprise vinyl aromatic monomer and alkyl ester of acrylic or alkyl acrylic acid. Typically the core polymer (II) is made up of hydrophobic alkyl (meth)acrylates, styrenes and vinyl compounds.

Preferable homopolymers of soft alkyl (meth)acrylates such as butyl acrylate and 2-ethylhexyl acrylate or copolymers with styrene.

The alkyl ester of acrylic or alkyl acrylic acid monomer may be selected from alkyl esters of acrylic acid or alkyl esters of methacrylic acid. Preferably, alkyl esters of acrylic acid.

Suitable alkyl esters of acrylic and methacrylic acid are, for example, methyl acrylate, methyl methacrylate, ethyl acrylate, ethyl methacrylate, propyl acrylate, butyl acrylate, pentyl acrylate, hexyl acrylate, and 2-ethyl hexyl acrylate. Preferably, 2-ethyl hexyl acrylate.

Suitable vinyl aromatic monomers are as already defined with regard to the stabiliser polymer (I).

The amount of vinyl aromatic monomer present in the stabiliser polymer (I) may be in the range from 10 wt. % to 70 wt. %. Preferably, 15 wt. % to 55 wt. %. More preferably from, 20 wt. % to 45 wt. %. Most preferably, from 25 wt. % to 35 wt. %.

The amount of alkyl ester of acrylic or alkyl acrylic acid monomer present in the stabiliser polymer (I) may be in the range from 90 wt. % to 30 wt. %. Preferably, 85 wt. % to 45 wt. %. More preferably from, 80 wt. % to 55 wt. %. Most preferably, from 75 wt. % to 65 wt. %.

Other examples of core polymers include those selected from acrylic polymers, styrene polymers and hydrogenated products thereof, vinyl polymers and derivatives thereof, polyolefins and hydrogenated or epoxidised products thereof, aldehyde polymers, epoxide polymers, polyamides, polyesters, polyurethanes, sulphone-based polymers and natural polymers and derivatives thereof.

Examples of acrylic monomers are (meth)acrylic acid or salts thereof, (meth)acrylamide, (meth)acrylonitrile, C1-6-alkyl (meth)acrylates such as ethyl (meth)acrylate, butyl (meth)acrylate or hexyl (meth)acrylate, 2-ethylhexyl (meth)acrylate, substituted C1-6-alkyl (meth)acrylates such as glycidyl methacrylate and acetoacetoxyethyl methacrylate, di(C1-4-alkylamino)C1-6-alkyl (meth)acrylates such as dimethylaminoethyl acrylate or diethylaminoethyl acrylate, amides formed from C1-6-alkylamines, substituted C1-6-alkyl-amines such as 2-amino-2-methyl-1-propane sulphonic acid, ammonium salt, or di(C1-4-alkyl-amino)C1-6-alkylamines and (meth)acrylic acid and C1-4-alkyl halide adducts thereof.

Examples of acrylic polymers are poly(methyl methacrylate) and poly(butyl methacrylate), as well as carboxylated acrylic copolymers as sold for example by Ciba under the tradenames Ciba® Glascol® LE15, LS20 and LS24, styrene acrylic copolymers as sold for example by Ciba under the tradenames Ciba® Glascol® LS26 and Ciba® Glascol® C44, and polyacrylic acid polymers as sold for example by Ciba under the tradename Ciba® Glascol® E11.

Examples of styrene monomers are styrene, 4-methylstyrene and 4-vinylbiphenyl. Examples of styrene polymers are styrene butadiene styrene block polymers, styrene ethylene butadiene block polymers, styrene ethylene propylene styrene block polymers and styrene-maleic anhydride copolymers.

Examples of vinyl monomers are vinyl alcohol, vinyl chloride, vinylidene chloride, vinyl isobutyl ether and vinyl acetate. Examples of olefin monomers are ethylene, propylene, butadiene and isoprene and chlorinated or fluorinated derivatives thereof such as tetrafluoroethylene. Examples of maleic monomers are maleic acid, maleic anhydride and maleimide.

Examples of vinyl polymers are polyvinyl chloride, polyvinylalcohol, polyvinylacetate, partially hydrolysed polyvinyl acetate and methyl vinyl ether-maleic anhydride copolymers. Examples of derivatives thereof are carboxy-modified polyvinyl alcohol, acetoacetyl-modified polyvinyl alcohol, diacetone-modified polyvinyl alcohol and silicon-modified polyvinyl alcohol.

Examples of polyolefines are polyethylene, polypropylene, polybutadiene and isopropylene-maleic anhydride copolymer Examples of aldehyde monomers are formaldehyde, furfural and butyral. Examples of alcohol monomers are phenol, cresol, resorcinol and xylenol. An example of polyalcohol is polyvinyl alcohol. Examples of amine monomers are aniline and melamine Examples of urea monomers are urea, thiurea and dicyandiamide.

An example of an aldehyde polymer is polyvinyl butyral formed from butyral and polyvinylalcohol.

Examples of epoxide monomers are epichlorohydrine and glycidol. Examples of alcohol monomers are phenol, cresol, resorcinol, xylenol, bisphenol A and glycol. An example of epoxide polymer is phenoxy resin, which is formed from epichlorohydrin and bisphenol A.

An example of a monomer having an amide group is caprolactam. An example of a diamine is 1,6-diaminohexane. Examples of dicarboxylic acids are adipic acid, terephthalic acid, isophthalic acid and 1,4-naphthalene-dicarboxylic acid. Examples of polyamides are polyhexamethylene adipamide and polycaprolactam.

An example of a monomer having a hydroxy as well as a carboxy group is adipic acid. An example of a diol is ethylene glycol. An example of a monomer having a lactone group is caprolactone. Examples of dicarboxylic acids are terephthalic acid, isophthalic acid and 1,4-naphthalenedicarboxylic acid. An example of a polyester is polyethylene terephthalate. So-called alkyd resins are also regarded to belong to polyester polymers.

Examples of diisocyanate monomers are hexamethylene diisocyanate, toluene diisocyanate and diphenylmethane diisocyanate.

Examples of sulphone-based polymers are polyarylsulphone, polyethersulphone, polyphenyl-sulphone and polysulphone. Polysulphone is a polymer formed from 4,4-dichlorodiphenyl sulphone and bisphenol A.

Examples of natural polymers are starch, cellulose, gelatine, casein and natural rubber. Examples of derivatives are oxidised starch, starch-vinyl acetate graft copolymers, hydroxyethyl cellulose, hydroxypropyl cellulose, methyl cellulose, ethyl cellulose, carboxymethyl cellulose and acetyl cellulose.

The core polymer (II) may also be a mixture of polymeric binders, and/or it may be a mixture of liquid monomers and a suitable photoinitiator that forms one of the listed core polymers under UV irradiation after coating.

Preferably, the core polymer (II) is selected from the group consisting of acrylic polymers, styrene polymers, vinyl polymers and derivatives thereof, polyolefins, polyurethanes and natural polymers and derivatives thereof.

More preferably, the core polymer (II) is selected from the group consisting of acrylic polymers, styrene butadiene copolymers, styrene-maleic anhydride copolymers, polyvinyl alcohol, polyvinyl acetate, partially hydrolysed polyvinyl acetate, methyl vinyl ether-maleic anhydride copolymers, carboxy-modified polyvinyl alcohol, acetoacetyl-modified polyvinyl alcohol, diacetone-modified polyvinyl alcohol and silicon-modified polyvinyl alcohol, isopropylene-maleic anhydride copolymer, polyurethane, cellulose, gelatine, casein, oxidised starch, starch-vinyl acetate graft copolymers, hydroxyethyl cellulose, methyl cellulose, ethyl cellulose, carboxymethyl cellulose and acetyl cellulose.

Most preferably the core polymer (II) is selected from copolymers of an acrylate and a styrene. Said acrylate selected from the list comprising 2-ethyl-hexyl acrylate, butyl acrylate, sec-butyl acrylate, ethyl acrylate, methyl acrylate, acrylic acid, acrylamide, iso-butyl acrylate, methyl methacrylate, or combinations thereof. Said styrene selected from the list comprising styrene, tert-butyl styrene, para-methyl styrene, or combinations thereof.

The polymer desirably has a molecular weight of no more than 10,000.

The core polymers (II) are known in the art and can be produced by known methods, e.g. by polymerisation starting from suitable monomers. The core polymer (II) may preferably be formed in-situ when forming the emulsion polymer with the pre-formed stabiliser polymer (I).

The emulsion polymer b) may be made by any known method, and in particular by emulsion polymerisation. In particular the core polymer may be formed in-situ during the emulsion polymerisation process to form the core polymer stabilised with low molecular weight stabiliser.

It will be appreciated that other methods may be used to form the polymer, such as bulk polymerisation, may be used.

The reaction method used may form polymer droplets or particles.

Preferred emulsion polymers b) may be selected from the following:
  core polymer is 75% 2-ethylhexyl acrylate 25% styrene, stabiliser polymer is 65% acrylic acid 35% styrene, sodium salt (100%), molecular weight of ~10,000 Da, core:stabiliser ratio of 70:30, % solids measured as 46%.
  core polymer is 75% 2-ethylhexyl acrylate 25% styrene, stabiliser polymer is 52% acrylic acid 48% styrene, sodium salt (100%), molecular weight of ~6,500 Da, core:stabiliser ratio of 60:40, % solids measured as 44%.
  core polymer is 75% 2-ethylhexyl acrylate 25% styrene, stabiliser polymer is 28% acrylic acid 72% styrene, mixed sodium (66%) and ammonium (33%) salt, molecular weight of ~8,000 Da, core:stabiliser ratio of 70:30, % solids measured as 43%.
  core polymer is 75% 2-ethylhexyl acrylate 25% styrene, stabiliser polymer is 28% acrylic acid 72% styrene, mixed sodium (66%) and ammonium (33%) salt, molecular weight of ~8000 Da, core:stabiliser ratio of 70:30, % solids measured as 46.5%.
  core polymer is 75% 2-ethylhexyl acrylate 25% styrene, stabiliser polymer is 28% acrylic acid 72% styrene, mixed sodium (66%) and ammonium (33%) salt, molecular weight of ~8000 Da, core:stabiliser ratio of 65:35, % solids measured as 44%.
  core polymer is 75% 2-ethylhexyl acrylate 25% styrene, stabiliser polymer is 28% acrylic acid 72% styrene, sodium salt (100%), molecular weight of ~8,000 Da, core:stabiliser ratio of 70:30, % solids measured as 55%.
  core polymer is 75% 2-ethylhexyl acrylate 25% styrene, stabiliser polymer is 28% acrylic acid 72% styrene, sodium salt (100%), molecular weight of ~8,000 Da, core:stabiliser ratio of 60:40, % solids measured as 50.5%.
  core polymer is 75% 2-ethylhexyl acrylate 25% styrene, stabiliser polymer is 28% acrylic acid 72% styrene, sodium salt (100%), molecular weight of ~8,000 Da, core:stabiliser ratio of 65:35, % solids measured as 45%.
  D—core polymer is 75% butyl acrylate 25% styrene, stabiliser polymer is 28% acrylic acid 72% styrene, sodium salt (100%), molecular weight of ~8,000 Da, core:stabiliser ratio of 70:30, % solids measured as 45%.
  core polymer is 75% 2-ethylhexyl acrylate 25% methyl methacrylate, stabiliser polymer is 28% acrylic acid 72% styrene, sodium salt (100%), molecular weight of ~8,000 Da, core:stabiliser ratio of 70:30, % solids measured as 45%.
  core polymer is 75% 2-ethylhexyl acrylate 25% styrene, stabiliser polymer is 35% acrylic acid 65% methyl methacrylate, sodium salt (100%), molecular weight of ~6,500 Da, core:stabiliser ratio of 70:30, % solids measured as 45%.
  core polymer is 75% 2-ethylhexyl acrylate 25% styrene, stabiliser polymer is 35% methacrylic acid 65% styrene, sodium salt (100%), molecular weight of ~6,500 Da, core:stabiliser ratio of 70:30, % solids measured as 45%.

The ratio of stabiliser polymer (I) to core polymers (II) in the emulsion polymer b) may be 50:50. More preferably, 40:60. Further preferably, 30:70. Most preferably the stabiliser will be present in the amount from 15-25 with the core being present in the amount from 85-75.

The emulsion polymer b) is preferably water soluble and water swellable.

The emulsion polymer and/or the stabiliser polymer have some grafting, and according to the present invention the term 'emulsion polymer' refers to systems of the two polymers which are not mere blends of each individual polymer and may be considered as a copolymer. It is shown that the emulsion polymer is not a mere blend of the individual polymers, and that a simple blend of polymers would not provide for the effects seen with the emulsion polymer of the present invention.

The polymers brought together in the emulsion copolymer may be thought to be incompatible, but bringing them together and forming some grating between the two allows the normally incompatible polymers to be brought together.

Optionally the stabiliser core copolymer may be cross-linked, and the method of making the emulsion polymer may comprise addition of a cross linker, with specific choice of cross linker determinable by the skilled person.

The viscosity of the emulsion polymer b) at 100 rpm may be less than 100 cP. Preferably, less than 80 cP. More preferably, less than 50 cP.

The viscosity of the emulsion polymer b) at 10 rpm may be less than 200 cP. Preferably, less than 150 cP. More preferably, less than 100 cP.

The solids content of the emulsion polymer b) is preferably in the range from 20 to 80%. More preferably, from 30 to 70%. Most preferably, from 40 to 60%.

In the form of a distribution of particle sizes, the polymer particles would have a median volume particle diameter value. It will be understood that the D(v,0.9) particle diameter refers to the equivalent spherical diameter corresponding to the point on the distribution where equivalent spherical diameter corresponding to 90% or 10% respectively of the volume of all the particles, read on the cumulative distribution curve relating volume percentage to the diameter of the particles, i.e. it is the point where 10% of the distribution is above this value and 90% is below the value.

The particle size values, used to determine the D(v,0.9) values were determined by dynamic light scattering analysis by using a Malvern Mastersizer 2000 with a Hydro 2000SM attachment running on water set at 2,100 rpm. The refractive index of the material is set as 1.53 with an absorbance of 0.1. 12,000 snaps were taken over 12 seconds to obtain the data. An average of three runs was used to determine a final particle size. From the particle size values obtained, D(v,0.9) values were readily determined.

The polymer particles may have a D(v,0.9) value in the range from 1,000 nm to 20 nm. Preferably, in the range from 500 nm to 30 nm. More preferably, in the range from 400 nm to 40 nm. Most preferably, in the range from 200 nm to 50 nm.

Most preferred emulsion polymers b) are selected from the following Table 1:

TABLE 1

Details of emulsion polymer systems b)

| Emulsion Polymer No. | Core polymer Core composition ratio | | Stabilising polymer | | |
|---|---|---|---|---|---|
| | | | AA:Sty ratio | Neutralisation salt | | MW of stabilizer |
| | Styrene | 2-EHA | | Ammonium Salt | Sodium Salt | |
| (1) | 25 | 75 | 52:48 | 0% | 100% | ~10000 |
| (2) | 25 | 75 | 65:35 | 0% | 100% | ~10000 |
| (3) | 25 | 75 | 35:65 | 0% | 100% | ~10000 |
| (4) | 25 | 75 | 35:65 | 0% | 100% | ~6500 |
| (5) | 25 | 75 | 35:65 | 0% | 100% | ~6500 |
| (6) | 25 | 75 | 40:60 | 0% | 100% | ~10000 |
| (7) | 25 | 75 | 40:60 | 0% | 100% | ~6500 |
| (8) | 25 | 75 | 52:48 | 0% | 100% | ~6500 |
| (9) | 25 | 75 | 28:72 | 33% | 66% | ~8000 |
| (10) | 75 | 25 | 28:72 | 33% | 66% | ~8000 |
| (11) | 25 | 75 | 28:72 | 66% | 33% | ~8000 |
| (12) | 25 | 75 | 28:72 | 100% | 0% | ~8000 |
| (13) | 25 | 75 | 28:72 | 0 | 100% | ~8000 |
| (14) | 25 | 75 | 28:72 | 0 | 100% | ~8000 |
| (15) | 25 | 75 | 28:72 | 66% | 33% | ~8000 |
| (16) | 25 | 75 | 65:35 | 0% | 100% | ~10000 |
| (17) | 25 | 75 | 28:72 | 33% | 66% | ~8000 |
| (18) | 25 | 75 | 28:72 | 33% | 66% | ~8000 |
| (19) | 25 | 75 | 28:72 | 33% | 66% | ~8000 |
| (20) | 25 | 75 | 28:72 | 33% | 66% | ~8000 |

TABLE 2

Data of resulting emulsion polymer Final Emulsion Polymer

| Emulsion Polymer No. | Core:stabiliser ratio | Solids content % | pH |
|---|---|---|---|
| (1) | 60:40 | 49.8 | 7.89 |
| (2) | 70:30 | 46.2 | 8.2 |
| (3) | 60:40 | 49 | 8.44 |
| (4) | 70:30 | 47.15 | 8.22 |
| (5) | 60:40 | 44.6 | 8.4 |
| (6) | 70:30 | 43.7 | 8.69 |
| (7) | 70:30 | 46.4 | 8.1 |
| (8) | 60:40 | 44 | 7.52 |
| (9) | 70:30 | 43.4 | 8.08 |
| (10) | 70:30 | 48.19 | 8.37 |
| (11) | 70:30 | 46.53 | 7.97 |
| (12) | 70:30 | 46.96 | 8.09 |
| (13) | 60:40 | 50.51 | 8.74 |
| (14) | 70:30 | 55 | 8.72 |
| (15) | 70:30 | 45.93 | 8.19 |
| (16) | 70:30 | 44.91 | 8.1 |
| (17) | 70:30 | 41.15 | 7.67 |
| (18) | 70:30 | 45.05 | 8.2 |
| (19) | 70:30 | 45 | 8.08 |
| (20) | 65:35 | 44 | 8 |

Suitable non-ionic surfactants or dispersing aids c) are all substances of this type which can customarily be employed in agrochemical agents. Preferably, polyethylene oxide-polypropylene oxide block copolymers, polyethylene glycol ethers of branched or linear alcohols, reaction products of fatty acids or fatty acid alcohols with ethylene oxide and/or propylene oxide, furthermore polyvinyl alcohol, polyoxyalkylenamine derivatives, polyvinylpyrrolidone, copolymers of polyvinyl alcohol and polyvinylpyrrolidone, and copolymers of (meth)acrylic acid and (meth)acrylic acid esters, furthermore branched or linear alkyl ethoxylates and alkylaryl ethoxylates, where polyethylene oxide-sorbitan fatty acid esters may be mentioned by way of example Out of the examples mentioned above selected classes can be optionally phosphated, sulphonated or sulphated and neutralized with bases.

Possible anionic surfactants c) are all substances of this type which can customarily be employed in agrochemical agents Alkali metal, alkaline earth metal and ammonium salts of alkylsulphonic or alkylphosphoric acids as well as alkylarylsulphonic or alkylarylphosphoric acids are preferred. A further preferred group of anionic surfactants or dispersing aids are alkali metal, alkaline earth metal and ammonium salts of polystyrenesulphonic acids, salts of polyvinylsulphonic acids, salts of alkylnaphthalene sulphonic acids, salts of naphthalene-sulphonic acid-formaldehyde condensation products, salts of condensation products of naphthalenesulphonic acid, phenolsulphonic acid and formaldehyde, and salts of lignosulphonic acid.

A rheological modifier is an additive that when added to the recipe at a concentration that reduces the gravitational separation of the dispersed active ingredient results in a substantial increase in the viscosity at low shear rates. Low shear rates are defined as 0.1 s$^{-1}$ and below and a substantial increase as greater than ×2 for the purpose of this invention. The viscosity can be measured by a rotational shear rheometer.

Suitable rheological modifiers d) by way of example are:
Polysaccharides including xanthan gum, guar gum and hydroxyethyl cellulose. Examples are Kelzan®, Rhodopol® G and 23, Satiaxane® CX911 and Natrosol® 250 range.
Clays including montmorillonite, bentonite, sepeolite, attapulgite, laponite, hectorite. Examples are Veegum® R, Van Gel® B, Benton® CT, HC, EW, Pangel® M100, M200, M300, S, M, W, Attagel® 50, Laponite® RD,
Fumed and precipitated silica, examples are Aerosil® 200, Siponat® 22.

Preferred are xanthan gum, montmorillonite clays, bentonite clays and fumed silica.

Suitable other formulants e) are selected from antifoams, biocides, antifreeze, colourants, pH adjusters, buffers, stabilisers, antioxidants, inert filling materials, humectants, crystal growth inhibitors, micronutrients, penetration promoters, wetting agents, spreading agents and/or retention agents by way of example are:

Suitable antifoam substances are all substances which can customarily be employed in agrochemical agents for this purpose. Silicone oils, silicone oil preparations are preferred. Examples are Silcolapse® 426 and 432 from Bluestar Silicones, Silfoam® SRE and SC132 from Wacker, SAG 1572 and SAG 30 from Momentive [Dimethyl siloxanes and silicones, CAS No. 63148-62-9].

Possible preservatives are all substances which can customarily be employed in agrochemical agents for this purpose. Suitable examples for preservatives are preparations containing 5-chloro-2-methyl-4-isothiazolin-3-one [CAS- No. 26172-55-4], 2-methyl-4-isothiazolin-3-one [CAS-No. 2682-20-4] or 1,2-benzisothiazol-3(2H)-one [CAS-No. 2634-33-5]. Examples which may be mentioned are Preventol® D7 (Lanxess), Kathon® CG/ICP (Dow), Acticide® SPX (Thor GmbH) and Proxel® GXL (Arch Chemicals).

Suitable antifreeze substances are all substances which can customarily be employed in agrochemical agents for this purpose. Suitable examples are propylene glycol, ethylene glycol, urea and glycerine.

Possible colourants are all substances which can customarily be employed in agrochemical agents for this purpose. Titanium dioxide, carbon black, zinc oxide, blue pigments, Brilliant Blue FCF, red pigments and Permanent Red FGR may be mentioned by way of example.

Possible pH adjusters and buffers are all substances which can customarily be employed in agrochemical agents for this purpose. Citric acid, sulfuric acid, hydrochloric acid, sodium hydroxide, sodium hydrogen phosphate ($Na_2HPO_4$), sodium dihydrogen phosphate ($NaH_2PO_4$), potassium dihydrogen phosphate ($KH_2PO_4$), potassium hydrogen phosphate ($K_2HPO_4$), may be mentioned by way of example.

Suitable stabilisers and antioxidants are all substances which can customarily be employed in agrochemical agents for this purpose. Butylhydroxytoluene [3,5-Di-tert-butyl-4-hydroxytoluol, CAS-No. 128-37-0] is preferred.

Suitable penetration promoters, wetting agents, spreading agents and/or retention agents (f) by way of example are:
- ethoxylated branched alcohols (e.g. Genapol® X-type) with 2-20 EO units;
- methyl end-capped, ethoxylated branched alcohols (e.g. Genapol® XM-type) comprising 2-20 EO units;
- ethoxylated coconut alcohols (e.g. Genapol® C-types) comprising 2-20 EO units;
- ethoxylated C12/15 alcohols (e.g. Synperonic® A-types) comprising 2-20 EO units;
- propoxy-ethoxylated alcohols, branched or linear, e.g. Antarox® B/848, Atlas® G5000, Lucramul® HOT 5902;
- propoxy-ethoxylated fatty acids, Me end-capped, e.g. Leofat® OC0503M;
- organomodified polysiloxanes, e.g. BreakThru® OE444, BreakThru® 5240, Silwett® L77, Silwett® 408, Silwet® 806;
- mono- and diesters of sulfosuccinate Na salts with branched or linear alcohols comprising 1-10 carbon atoms;
- ethoxylated diacetylene-diols (e.g. Surfynol® 4xx-range);
- alkyl ether citrate surfactants (e.g. Adsee CE range, Akzo Nobel);
- alkylpolysaccharides (e.g. Agnique® PG8107, PG8105, Atplus® 438, AL-2559, AL-2575);
- ethoxylated mono- or diesters of glycerine comprising fatty acids with 8-18 carbon atoms and an average of 10-40 EO units (e.g. Crovol® range);
- castor oil ethoxylates comprising an average of 5-40 EO units (e.g. Berol® range, Emulsogen® EL range);
- block-copolymer of polyethylene oxide and polypropylene oxide.

Preferred penetration promoters, wetting agents, spreading agents and/or retention agents are organomodified polysiloxanes, mono- and diesters of sulfosuccinate Na salts with branched or linear alcohols comprising 1-10 carbon atoms, ethoxylated mono- or diesters of glycerine comprising fatty acids with 8-18 carbon atoms and an average of 10-40 EO units, ethoxylated diacetylene-diols, propoxy-ethoxylated alcohols and ethoxylated alcohols.

Oils that function as penetration promoters, suitable oils are all substances of this type which can customarily be employed in agrochemical agents. Preferably, oils of vegetable, mineral and animal origin and alkyl esters of these oils. Examples are:
- sunflower oil, rapeseed oil, corn oil, soybean oil, rice bran oil, olive oil;
- ethylhexyl oleate, ethylhexyl palmitate, ethylhexyl myristate/laurate, ethylhexyl laurate, ethylhexyl caprylate/caprate, iso-propyl myristate, iso-propyl palmitate, methyl oleate, methyl palmitate, ethyl oleate, rape seed oil methyl ester, soybean oil methyl ester, rice bran oil methyl ester,
- Exxsol® D100, Solvesso® 200ND.

Preferred oils are methyl oleate, rape seed oil methyl ester, soybean oil methyl ester, rice bran oil methyl ester, rapeseed oil and ethylhexyl palmitate.

The formulations according to the invention constitute formulations which remain stable even following prolonged storage at elevated temperatures or in the cold, since no significant thickening or aggregation is observed. By dilution with water they can be converted into homogeneous spray liquids. These spray liquids are applied by customary methods, i.e., for example, by spraying, pouring or injecting.

The application rate of the formulations according to the invention can be varied within a relatively wide range. It is guided by the particular active agrochemicals and by their amount in the formulations.

With the aid of the formulations according to the invention it is possible to deliver active agrochemical to plants and/or their habitat in a particularly advantageous way.

The present invention is also directed to the use of agrochemical compositions according to the invention for the application of the agrochemical active compounds contained to plants and/or their habitat.

With the formulations of the invention it is possible to treat all plants and plant parts. By plants here are meant all plants and plant populations, such as desirable and unwanted wild plants or crop plants (including naturally occurring crop plants). Crop plants may be plants which can be obtained by conventional breeding and optimization methods or by biotechnological and gene-technological methods or combinations of these methods, including the transgenic plants and including the plant cultivars which can or cannot be protected by varietal property rights. By plant parts are to be meant all above-ground and below-ground parts and organs of the plants, such as shoot, leaf, flower and root, an exemplary listing embracing leaves, needles, stems, trunks, flowers, fruit bodies, fruits and seeds and also roots, tubers and rhizomes. The plant parts also include harvested material and also vegetative and generative propagation material.

What may be emphasized in this context is the particularly advantageous effect of the formulations according to the invention with regard to their use in cereal plants such as, for example, wheat, oats, barley, spelt, triticale and rye, but also in maize, sorghum and millet, rice, sugar cane, soya beans, sunflowers, potatoes, cotton, oilseed rape, canola, tobacco, sugar beet, fodder beet, asparagus, hops and fruit plants (comprising pome fruit such as, for example, apples and pears, stone fruit such as, for example, peaches, nectarines, cherries, plums and apricots, citrus fruits such as, for example, oranges, grapefruits, limes, lemons, kumquats, tangerines and satsumas, nuts such as, for example, pistachios, almonds, walnuts and pecan nuts, tropical fruits such as, for example, mango, *papaya*, pineapple, dates and bananas, and grapes) and vegetables (comprising leaf vegetables such as, for example, endives, corn salad, Florence fennel, lettuce, cos lettuce, Swiss chard, spinach and chicory for salad use, cabbages such as, for example, cauliflower, broccoli, Chinese leaves, *Brassica oleracea* (L.) convar. *acephala* var. *sabellica* L. (curly kale, feathered cabbage), kohlrabi, Brussels sprouts, red cabbage, white cabbage and Savoy cabbage, fruit vegetables such as, for example, aubergines, cucumbers, capsicums, table pumpkins, tomatoes, courgettes and sweetcorn, root vegetables such as, for example celeriac, wild turnips, carrots, including yellow cultivars, *Raphanus sativus* var. *niger* and var. *radicula*, beetroot, scorzonera and celery, legumes such as, for example, peas and beans, and vegetables from the *Allium* family such as, for example, leeks and onions.

The treatment of the plants and plant parts in accordance with the invention with the inventive formulations is carried out directly or by action on their environment, habitat or storage area in accordance with the customary treatment methods, for example by dipping, spraying, vaporizing, atomizing, broadcasting or painting on and, in the case of propagation material, especially seeds, additionally by single or multiple coating.

The active agrochemicals comprised develop a better biological activity than when applied in the form of the corresponding conventional formulations.

The invention is illustrated by the following examples.

EXAMPLES

A) Methods

The rainfastness was determined according to the following method.

Method 1:

A disc from an apple cuticle was fixed with the outside surface facing upwards to a glass microscope slide with a thin layer of medium viscosity silicone oil. To this 1 μl drops of the different formulations diluted at 0.5% to 1% in deionised water containing 5% CIPAC C water were applied with a micropipette and left to dry for 1 hour. Each deposit was examined in an optical transmission microscope fitted with crossed polarising filters and an image recorded. The slide containing the cuticle with the dried droplets of the formulations was held under gently running deionised water (flow rate approximately 300 ml/minute at a height 10 cm below the tap outlet) for 15 s. The glass slide was allowed to dry and the deposits were re-examined in the microscope and compared to the original images. The amount of active ingredient washed off was visually estimated and recorded at the following amounts: >90%, 75%, 50%, 25% and <10%. Two replicates were measured and the mean value of the two replicates recorded.

The formulations were prepared according to the following methods.

Method 2:

The method of the preparation of suspension concentrate formulations are known in the art and can be produced by known methods familiar to those skilled in the art. A 2% gel of the xanthan in water and the biocides (e) was prepared with low shear stirring. The active ingredient(s) (a), non-ionic and anionic dispersants (c) and other formulants (e) were mixed to form a slurry, first mixed with a high shear rotor-stator mixer to reduce the particle size $D(v,0.9)$ to approximately 50 microns, then passed through one or more bead mills to achieve a particles size $D(v,0.9)$ typically 1 to 15 microns as required for the biological performance of the active ingredient(s). Those skilled in the art will appreciate that this can vary for different active ingredients. The polymer dispersion (b) and xanthan gel were added and mixed in with low shear stirring until homogeneous.

Method 3:

The method of the preparation of suspo-emulsion formulations are known in the art and can be produced by known methods familiar to those skilled in the art. A 2% gel of the xanthan in water and the biocides (e) was prepared with low shear stirring. The active ingredient spiroxamine (a), oils (e) and antioxidant (e) were mixed and added to an aqueous dispersion comprising a portion (32 g/l) of the non-ionic dispersants (c) under high shear mixing with a rotor-stator mixer until an oil in water emulsion was formed with a droplet size $D(v,0.9)$ typically 1 to 5 microns. The active ingredient fluopyram (a), the remaining non-ionic and anionic dispersants (c) and other remaining formulants (e) were mixed with the remaining water to form a slurry, first mixed with a high shear rotor-stator mixer to reduce the particle size $D(v,0.9)$ to approximately 50 microns, then passed through one or more bead mills to achieve a particles size $D(v,0.9)$ typically 1 to 15 microns as required for the biological performance of the active ingredient(s). Those skilled in the art will appreciate that this can vary for different active ingredients. The oil in water emulsion, polymer dispersion (b) and xanthan gel were added and mixed in with low shear stirring until homogeneous.

The formulation stability was determined according to the following method.

Method 4:

The stability of the example formulations was determined by storing one sample at 45° C. for 1 week and storing another sample overnight at −30° C. and room temperature, RT, (22° C.) during the day or overnight at −15° C. and 30° C. during the day for five to eight cycles. They were then examined visually for any thickening and a 1% dilution in water was examined in a microscope for any signs of aggregation of the active ingredient particles. The sieve retention in Example 2 was determined by pouring 50 ml of a 1% suspension of each example formulation through a 150 micron sieve, rinsing with water and visually determining the sieve residue.

Example 1

Formulations were prepared with the following recipes:

| Component (g/l) | Example 1 |
| --- | --- |
| Fluopyram (a) | 500 |
| Non-ionic dispersants (c) | 60 |
| Anionic dispersants (c) | 15 |
| Rheological modifier (d) | 2.4 |
| Biocides (e) | 2.6 |
| Additive according to Table 3 (b) | 30 |
| Antifreeze (e) | 80 |
| Antifoam (e) | 2 |
| Water | To volume (~498) |

The method of preparation used was according to Method 2 with the wash-off determined according to Method 1 and the stability determined according to Method 4 described previously with the high temperature stability assessed after 1 week at 45° C. and the low temperature stability assessed after −30° C./RT cycling storage.

TABLE 3

List of additives used in Example 1 and corresponding wash-off and stability results.

| Additive (from table 2) | % wash-off | Stability 1W45 | Stability −30/RT (x5) |
|---|---|---|---|
| (1) | <10 | stable | stable |
| (2) | <10 | stable | stable |
| (3) | 17.5 | stable | stable |
| (4) | <10 | stable | stable |
| (5) | 17.7 | stable | stable |
| (6) | 37.5 | stable | stable |
| (7) | 25 | stable | stable |
| (8) | 75 | stable | aggregation |
| (9) | 25 | stable | Stable |
| (10) | 75 | stable | stable |
| (11) | <10 | stable | stable |
| (12) | 25 | stable | stable |
| (13) | 17.5 | stable | stable |
| (14) | 25 | stable | stable |
| Atlox Semkote ® E135 | 17.5 | stable | aggregation |
| No additive | >75 | stable | stable |

This example shows that the resin stabilised emulsion polymer additives significantly reduce wash-off of the active ingredient at a level similar to the comparison additive Atlox Semkote® E135 and also show better stability in the majority of cases than the comparison example of Atlox Semkote® E135.

Example 2

Suspo-emulsion formulations were prepared with the following recipes:

| Component (g/l) | Example 2 |
|---|---|
| Spiroxamine (a) | 200 |
| Fluopyram (a) | 75 |
| Antioxidant (e) | 0.5 |
| Non-ionic dispersants (c) | 37 |
| Anionic dispersants (c) | 7 |
| Rheological modifier (d) | 0.7 |
| Oils (e) | 160 |
| Biocides (e) | 2.5 |
| Additive from Table 4 (b) | 30 |
| Antifreeze (e) | 80 |
| Antifoam (e) | 2 |
| Water | To volume (~435) |

The method of preparation used was according to Method 3 with the wash-off determined according to Method 1 and the stability determined according to Method 4 described previously.

TABLE 4

List of additives used in Example 2 and corresponding wash-off and sieve retention results.

| Additive (from table 2) | % wash-off | Sieve retention (150 microns) |
|---|---|---|
| (1) | 50 | 0 |
| (2) | 82.5 | 0 |
| (6) | 82.5 | 0 |
| (9) | 50 | 0 |
| (11) | 37.5 | 0 |
| (12) | 50 | 0 |
| (13) | 50 | 0 |
| (14) | 62.5 | 0 |
| Atlox Semkote ® E135 | 50 | High |
| No additive | >90 | 0 |

This example 2 shows that the resin stabilised emulsion polymer additives significantly reduce wash-off of the active ingredient in Suspo-emulsion formulations at a level similar to the comparison additive Atlox Semkote® E135 and also show better dilution stability than the comparison example of Atlox Semkote® E135 which shows high unacceptable sieve residues.

Example 3

Formulations were prepared with the following recipes:

| Component (g/l) | Example 3 |
|---|---|
| Fluopyram (a) | 200 |
| Tebuconazole (a) | 200 |
| Non-ionic dispersants (c) | 65 |
| Anionic dispersants (c) | 8 |
| Rheological modifier (d) | 1.7 |
| Biocides (e) | 2.6 |
| Additive from table 5 (b) | 30 |
| Antifoam (e) | 4 |
| Antifreeze (e) | 25 |
| Wetting agents (f) | 90 |
| Water | To volume (~534) |

The method of preparation used was according to Method 2 with the wash-off determined according to Method 1 and the stability determined according to Method 4 described previously.

TABLE 5

List of additives used in Example 3 and corresponding wash-off and stability results.

| Additive (from table 2) | % wash-off | Stability 1W45 | Stability −30/RT x8 cycles |
|---|---|---|---|
| (1) | 75 | stable | stable |
| (2) | 75 | stable | stable |
| (3) | 75 | stable | aggregation x8 |
| (4) | 75 | aggregation | stable |
| (5) | 75 | aggregation | Stable |
| (6) | 90 | aggregation | stable |
| (7) | 90 | aggregation | stable |
| (8) | 82.5 | stable | stable |
| (9) | 62.5 | aggregation | stable |
| (10) | 82.5 | aggregation | stable |
| (11) | 75 | aggregation | stable |
| (12) | 75 | aggregation | stable |
| (13) | 75 | stable | aggregation x3 |
| (14) | 62.5 | stable | aggregation x3 |
| No additive | 90 | stable | stable |

This example shows that resin stabilised emulsion polymer additives (1), (2) and (8) have enhanced resistance to wash-off and give stable formulations both at 1W45 and −30/RT (×8) cycling storage testing. It is especially surprising that certain of the resin stabilised emulsion additives reduced wash-off in the presence of wetting agents (f).

Example 4

Formulations were prepared with the following recipes:

| Component (g/l) | Example 4 |
|---|---|
| Isotianil (a) | 135 |
| Tebuconazole (a) | 180 |
| Trifloxystrobin (a) | 90 |

-continued

| Component (g/l) | Example 4 |
|---|---|
| Non-ionic dispersants (c) | 25 |
| Anionic dispersants (c) | 20 |
| Rheological modifier (d) | 1 |
| Biocides (e) | 2.6 |
| Additive from table 6 (b) | 30 |
| Antifoam (e) | 2.5 |
| Antifreeze (e) | 100 |
| Wetting agents (f) | 70 |
| Water | To volume (~435) |

The method of preparation used was according to Method 2 with the wash-off determined according to Method 1 and the stability determined according to Method 4 described previously.

TABLE 6

List of additives used in Example 4 and corresponding wash-off and stability results.

| Additive (from table 2) | % wash-off | Stability 1W45 | Stability −30/RT (x6) |
|---|---|---|---|
| (1) | 50 | aggregation | aggregation |
| (2) | 62.5 | stable | stable |
| (3) | 50 | stable | stable |
| (4) | 50 | stable | stable |
| (5) | 50 | stable | stable |
| (6) | 62.5 | stable | stable |
| (7) | 50 | stable | stable |
| (8) | 62.5 | stable | stable |
| (9) | 50 | stable | stable |
| (10) | 62.5 | stable | stable |
| (11) | 50 | stable | stable |
| (12) | 50 | stable | stable |
| (13) | 50 | stable | stable |
| (14) | 50 | stable | stable |
| Atlox Semkote ® E135 | 50 | aggregation | aggregation |
| No additive | 75 | stable | stable |

This example shows that the resin stabilised emulsion polymer additives have enhanced resistance to wash-off in the example formulation equivalent or similar to the comparison additive Atlox Semkote® E135 and importantly give stable formulations both at 1W45 and −30/RT (x6) cycling storage testing while the comparison additive shows aggregation resulting in an unstable and unusable formulation. It is especially surprising that the resin stabilised emulsion additives work in the presence of wetting agents (f).

Example 5

Formulations were prepared with the following recipes:

| Component (g/l) | Example 5 |
|---|---|
| Aclinofen (a) | 375 |
| Diflufenican (a) | 50 |
| Flufenacet (a) | 150 |
| Non-ionic dispersants (c) | 61 |
| Anionic dispersants (c) | 12.2 |
| Rheological modifiers (d) | 8.5 |
| Biocides (e) | 3.2 |
| Antifoam (e) | 6.1 |
| Antifreeze (e) | 61 |
| Additive from table 7 (b) | 30 |
| Water | To volume (~443) |

The method of preparation used was according to Method 2 described previously, the rheological modifiers were incorporated with a rotor-stator mixer. The wash-off was determined according to Method 1 and the stability determined according to Method 4 described previously.

TABLE 7

List of additives used in Example 5 and corresponding wash-off and stability results.

| Additive (from table 2) | % wash-off | Stability 1W45 | Stability −30/RT (x6) |
|---|---|---|---|
| (1) | 75 | stable | stable |
| (2) | 62.5 | stable | stable |
| (6) | 62.5 | stable | stable |
| (9) | 75 | stable | stable |
| (11) | 50 | stable | stable |
| (12) | 50 | stable | stable |
| (13) | 62.5 | stable | stable |
| (14) | 50 | stable | stable |
| Atlox Semkote ® E135 | 37.5 | stable | unstable, aggregation and thick paste like appearance |
| No additive | 82.5 | stable | stable |

This example shows that the resin stabilised emulsion polymer additives reduce wash-off of the active ingredient. The comparison additive Atlox Semkote® E135 was completely unstable in the low temperature cycling test while surprisingly the resin stabilised polymer additives were stable.

Example 6

Formulations were prepared with the following recipes:

| Component (g/l) | Example 6 |
|---|---|
| Tetraniliprole (a) | 200 |
| Non-ionic dispersants (c) | 60.5 |
| Anionic dispersants (c) | 11 |
| Rheological modifier (d) | 11.33 |
| Biocides (e) | 2.2 |
| Antifreeze (e) | 110 |
| Antifoam (e) | 1.65 |
| Additive from table 8 (b) | 30 |
| Water | To volume (~702) |

The method of preparation used was according to Method 2 with the wash-off determined according to Method 1 and the stability determined according to Method 4 described previously with the high temperature stability assessed after 2w45° C.

TABLE 8

List of additives used in Example 6 and corresponding wash-off and stability results.

| Additive (from table 2) | % wash-off | Stability 2W45 | Stability −30/RT (x5) |
|---|---|---|---|
| (11) | 50 | stable | stable |
| (13) | 50 | stable | stable |
| Atlox Semkote ® E135 | 62.5 | stable | stable |
| No rainfast-additive | >90 | stable | stable |

This example shows that the resin stabilised emulsion polymer additives (11) and (13) significantly reduced wash-off of the active ingredient and at a level greater than the comparison additive Atlox Semkote® E135. In this example no differences in stability were observed.

Example 7

Formulations were prepared with the following recipes:

| Component (g/l) | Example 7 |
| --- | --- |
| Spirodiclofen (a) | 240 |
| Non-ionic dispersants (c) | 32.4 |
| Rheological modifier (d) | 3.7 |
| Biocides (e) | 2.3 |
| Antifreeze (e) | 108 |
| Antifoam (e) | 1.1 |
| pH adjuster (e) | 1 |
| Additive from table 9 (b) | 40 |
| Water | To volume (~648) |

The method of preparation used was according to Method 2 with the wash-off determined according to Method 1 and the stability determined according to Method 4 described previously with the low temperature stability assessed after cycling storage at −15 and +30° C.

TABLE 9

List of additives used in Example 7 and corresponding wash-off and stability results.

| Additive (from table 2) | % wash-off | Stability 1W45 | Stability −15/30 (x5) |
| --- | --- | --- | --- |
| (20) | 50 | Stable: fluid suspension, particles dispersed | Stable: fluid suspension, particles dispersed |
| No rainfast-additive | 70 | Stable: fluid suspension, particles dispersed | Stable: fluid suspension, particles dispersed |

This example shows that the resin stabilised emulsion polymer additive (20) when included in the formulation resulted in a decrease in the amount of active ingredient washed off. Furthermore, the resin stabilised emulsion polymer did not cause the formulation to become unstable.

Example 8

Formulations were prepared with the following recipes:

| Component (g/l) | Example 8 |
| --- | --- |
| Spiromesifen (a) | 321 |
| Non-ionic dispersants (c) | 42.8 |
| Rheological modifier (d) | 3.2 |
| Biocides (e) | 2.1 |
| Antifreeze (e) | 107 |
| Antifoam (e) | 1.1 |
| pH adjuster (e) | 1.1 |
| Additive from table 10 (b) | 40 |
| Water | To volume (~592) |

The method of preparation used was according to Method 2 with the wash-off determined according to Method 1 and the stability determined according to Method 4 described previously.

TABLE 10

List of additives used in Example 8 and corresponding wash-off and stability results.

| Additive (from table 2) | % wash-off | Stability 1W45 | Stability −15/30 (x5) |
| --- | --- | --- | --- |
| (20) | 10 | Stable: fluid suspension, particles dispersed | Stable: fluid suspension, particles dispersed |
| No rainfast-additive | 62.5 | Stable: fluid suspension, particles dispersed | Stable: fluid suspension, particles dispersed |

This example shows that the resin stabilised emulsion polymer additive (20) when included in the formulation resulted in a substantial decrease in the amount of active ingredient washed off. Furthermore, the resin stabilised emulsion polymer did not cause the formulation to become unstable.

Example 9

Formulations were prepared with the following recipes:

| Component (g/l) | Example 9 |
| --- | --- |
| Ethiprole (a) | 100 |
| Non-ionic dispersants (c) | 51.5 |
| Anionic dispersants (c) | 51.5 |
| Rheological modifier (d) | 5.2 |
| Biocides (e) | 1.8 |
| Antifreeze (e) | 20.6 |
| Antifoam (e) | 5.2 |
| Penetration promoter (f) | 206 |
| Additive from table 11 (b) | 60 |
| Water | To volume (~585) |

The method of preparation used was according to Method 2 with the wash-off determined according to Method 1 and the stability determined according to Method 4 described previously.

TABLE 11

List of additives used in Example 9 and corresponding wash-off and stability results.

| Additive | % wash-off | Stability 1W45 | Stability −15/30 (x5) |
| --- | --- | --- | --- |
| (20) | 17.5 | Stable: fluid suspension, particles dispersed | Stable: fluid suspension, particles dispersed |
| No rainfast-additive | 75 | Stable: fluid suspension, particles dispersed | Stable: fluid suspension, particles dispersed |

This example shows that the resin stabilised emulsion polymer additive (20) when included in the formulation resulted in a substantial decrease in the amount of active ingredient washed off. Furthermore, the resin stabilised emulsion polymer did not cause the formulation to become unstable.

Example 10

Formulations were prepared with the following recipes:

| Component (g/l) | Example 10 |
| --- | --- |
| Fluopicolide (a) | 200 |
| Non-ionic dispersants (c) | 12 |
| Anionic dispersants (c) | 6 |
| Rheological modifier (d) | 2.2 |
| Biocides (e) | 2.6 |
| Antifreeze (e) | 100 |
| Antifoam (e) | 2 |
| Additive from table 12 (b) | 50 |
| Water | To volume (~704) |

The method of preparation used was according to Method 2 with the wash-off determined according to Method 1 with six replicates and the stability determined according to Method 4 described previously.

TABLE 12

List of additives used in Example 10 and corresponding wash-off and stability results.

| Additive | % wash-off | Stability 1W45 | Stability −15/30 (x5) |
| --- | --- | --- | --- |
| (20) | 56 | Stable: fluid suspension, particles dispersed | Stable: fluid suspension, particles dispersed |
| No rainfast-additive | 63 | Stable: fluid suspension, particles dispersed | Stable: fluid suspension, particles dispersed |

This example shows that the resin stabilised emulsion polymer additive (20) when included in the formulation resulted in a decrease in the amount of active ingredient washed off. Furthermore, the resin stabilised emulsion polymer did not cause the formulation to become unstable.

Example 11

Formulations were prepared with the following recipes:

| Component (g/l) | Example 11 |
| --- | --- |
| Diflufenican (a) | 90 |
| Flufenacet (a) | 240 |
| Flurtamone (a) | 120 |
| Non-ionic dispersants (c) | 58.5 |
| Anionic dispersants (c) | 5.9 |
| Rheological modifier (d) | 3.5 |
| Biocides (e) | 2.3 |
| Antifreeze (e) | 93.6 |
| Antifoam (e) | 11.7 |
| pH adjuster (e) | 5.9 |
| Additive from table 13 (b) | 50 |
| Water | To volume (~724) |

The method of preparation used was according to Method 2 with the wash-off determined according to Method 1 and the stability determined according to Method 4 described previously.

TABLE 13

List of additives used in Example 11 and corresponding wash-off and stability results.

| Additive (from table 2) | % wash-off | Stability 1W45 | Stability −15/30 (x5) |
| --- | --- | --- | --- |
| (20) | 25 | Stable: fluid suspension, particles dispersed | Stable: fluid suspension, particles dispersed |
| No rainfast-additive | 75 | Stable: fluid suspension, particles dispersed | Stable: fluid suspension, particles dispersed |

This example shows that the resin stabilised emulsion polymer additive (20) when included in the formulation resulted in a substantial decrease in the amount of active ingredient washed off. Furthermore, the resin stabilised emulsion polymer did not cause the formulation to become unstable.

Example 12

Formulations were prepared with the following recipes:

| Component (g/l) | Example 12 |
| --- | --- |
| Clomeprop (a) | 90 |
| Fentrazamide (a) | 60 |
| Tefuryltrione (a) | 60 |
| Anionic dispersants (c) | 10.6 |
| Rheological modifier (d) | 2.4 |
| Biocides (e) | 0.5 |
| Antifreeze (e) | 53 |
| Antifoam (e) | 2.1 |
| pH adjuster (e) | 10.6 |
| Additive from table 14 (b) | 40 |
| Water | To volume (~769) |

The method of preparation used was according to Method 2 with the wash-off determined according to Method 1 and the stability determined according to Method 4 described previously.

TABLE 14

List of additives used in Example 12 and corresponding wash-off and stability results.

| Additive (from table 2) | % wash-off | Stability 1W45 | Stability −15/30 (x5) |
| --- | --- | --- | --- |
| (20) | 10 | Stable: fluid suspension, particles dispersed | Stable: fluid suspension, particles dispersed |
| No rainfast-additive | 17.5 | Stable: fluid suspension, particles dispersed | Stable: fluid suspension, particles dispersed |

This example shows that the resin stabilised emulsion polymer additive (20) when included in the formulation resulted in a decrease in the amount of active ingredient washed off. Furthermore, the resin stabilised emulsion polymer did not cause the formulation to become unstable.

Example 13

Formulations were prepared with the following recipes:

| Component (g/l) | Recipe 1 Not according to the invention | Recipe 2 According to the invention | Recipe 3 According to the invention |
|---|---|---|---|
| Trifloxystrobin (a) | 120 | 120 | 120 |
| Tebuconazole (a) | 240 | 240 | 240 |
| Non-ionic dispersants (c) | 25 | 25 | 25 |
| Anionic dispersants (c) | 20 | 20 | 20 |
| Rheological modifier (d) | 1.0 | 1.0 | 1.0 |
| Biocides (e) | 2.6 | 2.6 | 2.6 |
| Antifreeze (e) | 100 | 100 | 100 |
| Antifoam (e) | 5 | 5 | 5 |
| Wetting agents (f) | 100 | 100 | 90 |
| Additive (13) from table 2 (b) | 0 | 40 | 40 |
| Water | To volume (~504) | To volume (~464) | To volume (~474) |

The method of preparation used was according to Method 1 described previously. Recipe 1 and recipe 2 along with the references Nativo® WG and Nativo® SC were applied by spray application to rice plants at a trifloxystrobin dose of 50 g/ha and tebuconazole dose of 100 g/ha with a water volume of 100 L/ha. 1 hour after application the plants were placed in a purposely designed rain tower and artificial rain at an intensity of 30 mm/h was applied for 20 minutes. The plants were left to dry and analysed for active ingredients remaining both on and in the plants 15 hours after fungicide application.

TABLE 15

Amount of active ingredient remaining on and in the plants after artificial rainfall (applied 1 hour after application) measured 15 hours after fungicide application.

| % active ingredient remaining after rain | Recipe 1 | Recipe 2 | Native® WG | Nativo® SC |
|---|---|---|---|---|
| Trifloxystrobin (cv. *Japonica bailla*) | 61.5 | 88.4 | 37.7 | 74.1 |
| Tebuconazole (cv. *Japonica bailla*) | 38.4 | 47.6 | 26.7 | 44.1 |
| Trifloxystrobin (cv. *Indica*) | 94.3 | 100 | 38.2 | 45.3 |
| Tebuconazole (cv. *Indica*) | 50.7 | 58.4 | 24.7 | 25.2 |

This example shows that recipe 2 according to the invention containing the resin stabilised emulsion polymer additive consistently showed the highest rainfastness and lowest wash-off with the highest amount of active ingredient remaining after the application of artificial rain and reduced unwanted off-target losses to the environment.

Furthermore, after 6 months storage at RT and at 40° C. recipe 3 remained as a stable fluid suspension which readily formed sprayable dispersions on dilution without aggregation of the active ingredient particles demonstrating good stability of recipes according to the invention.

Example 14

In another example the biological performance of recipe 3 (according to the invention) and Nativo® WG was compared outdoors in paddy rice. The biological efficacy for leaf and neck rice blast disease was assessed 13-15 days after the second foliar spray application (assessment 1) and 21-35 days after the second or third foliar spray application (assessment 2) and the yield measured at harvest.

TABLE 16

Biological efficacy and yield results from example 14.

| Formulation | Rates trifloxystrobin g a.i./ha | Rates tebuconazole g a.i./ha | % disease control assessment 1 | % disease control assessment 2 | % yield increase over untreated |
|---|---|---|---|---|---|
| Nativo ® WG (reference, not according to the invention) | 50 | 25 | 69 | 56 | 189 |
| | 90 | 45 | 77 | 65 | 192 |
| | 120 | 60 | 74 | 72 | 203 |
| | 150 | 75 | 74 | 78 | 212 |
| Recipe 3 (according to the invention) | 50 | 25 | 70 | 65 | 197 |
| | 90 | 45 | 78 | 74 | 208 |
| | 120 | 60 | 81 | 80 | 222 |
| | 150 | 75 | 87 | 84 | 218 |

Recipe 3 containing the resin stabilised emulsion polymer additive according to the invention showed both improved efficacy and improved yield compared to the reference, Nativo® WG.

The invention claimed is:
1. An agrochemical composition comprising
   a) an aqueous dispersion of at least one agrochemical active compound, which is solid at room temperature,
   b) an emulsion polymer system comprising I) anionic stabiliser polymer; and II) core-stabiliser copolymer, wherein the I) anionic stabiliser polymer comprises acid based and hydrophobe monomers having a weight/number ratio of said acid to hydrophobe of 10-90:90-10, a Tg in the range from 30° C. to 300° C., and a molecular weight less than 100,000; and wherein the I) anionic stabiliser polymer is a styrene (meth)acrylic acid copolymer,
   and wherein the II) core-stabiliser polymer has a Tg in the range from −100° C. to 10° C. and is a copolymer of 2-ethyl-hexyl acrylate and a styrene;
   wherein the weight ratio of anionic stabilizer polymer to core-stabiliser copolymer is between 30:70 to 40:60,
   c) one or more additives selected from the group consisting of non-ionic or anionic surfactants or dispersing aids,
   d) one or more rheological modifiers wherein the one or more rheological modifiers is selected from xanthan gum, montmorillonite clays, bentonite clays and fumed silica, and e) one or more other formulants selected from antifoams, biocides, antifreeze, colorants, pH adjusters, buffers, stabilisers, antioxidants, inert filling materials, humectants, crystal growth inhibitors, micronutrients, penetration promoters, wetting agents, spreading agents and/or retention agents.

2. An agrochemical composition according to claim 1, further comprising
   f) one or more penetration promoters, wetting agents, spreading agents and/or retention agents.

3. A product comprising the agrochemical composition according to claim 1 for foliar application.

4. A product comprising the agrochemical composition according to claim 1 to combat or control an agricultural pest, weed or disease.

5. A product comprising the agrochemical composition according to claim 1 for application of the agrochemical active compound contained to one or more plants and/or a habitat thereof.

6. A product comprising the agrochemical composition according to claim 1 to improve the rainfastness of an agrochemical active ingredient.

7. A product comprising the agrochemical composition according to claim 1 to improve the resistance to wash-off by rain of an agrochemical active ingredient.

8. A product comprising the agrochemical composition according to claim 1 to reduce off-target losses to the environment of an agrochemical active ingredient.

9. An agrochemical composition according to claim 1, wherein the I) anionic stabiliser polymer has a Tg in the range from 70° C. to 150° C.

10. An agrochemical composition according to claim 1, wherein the molar ratio of the residues of the (meth)acrylic monomer(s) to those of the styrene monomer(s) of the anionic stabiliser polymer is from 20:1 to 1:5.

* * * * *